G. B. ST. JOHN.
CULTIVATOR.
No. 49,008. Patented July 25, 1865.
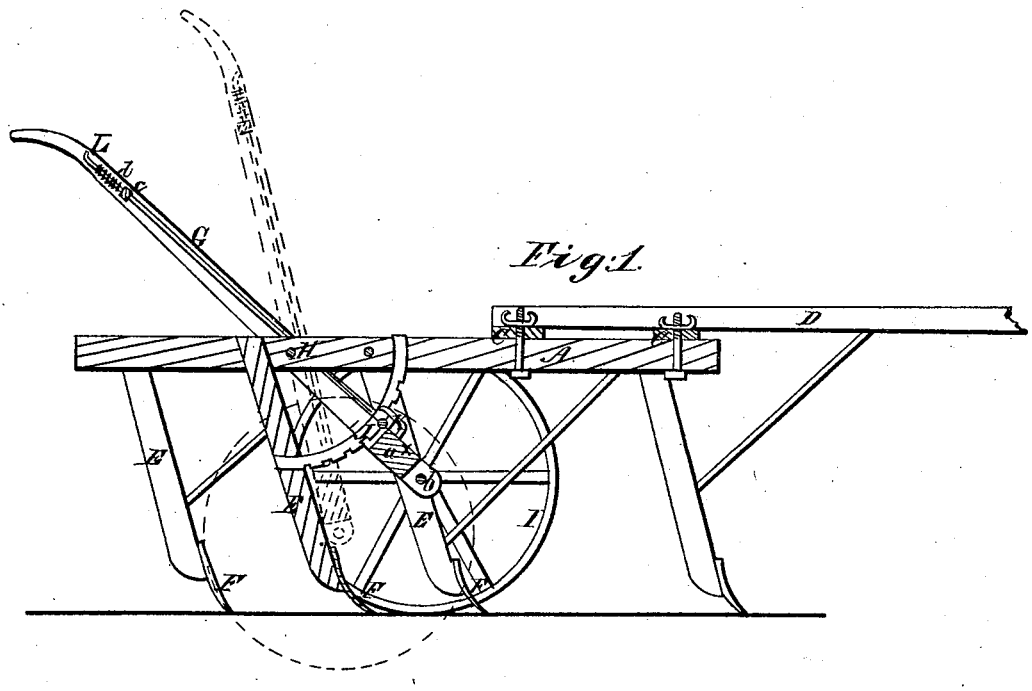
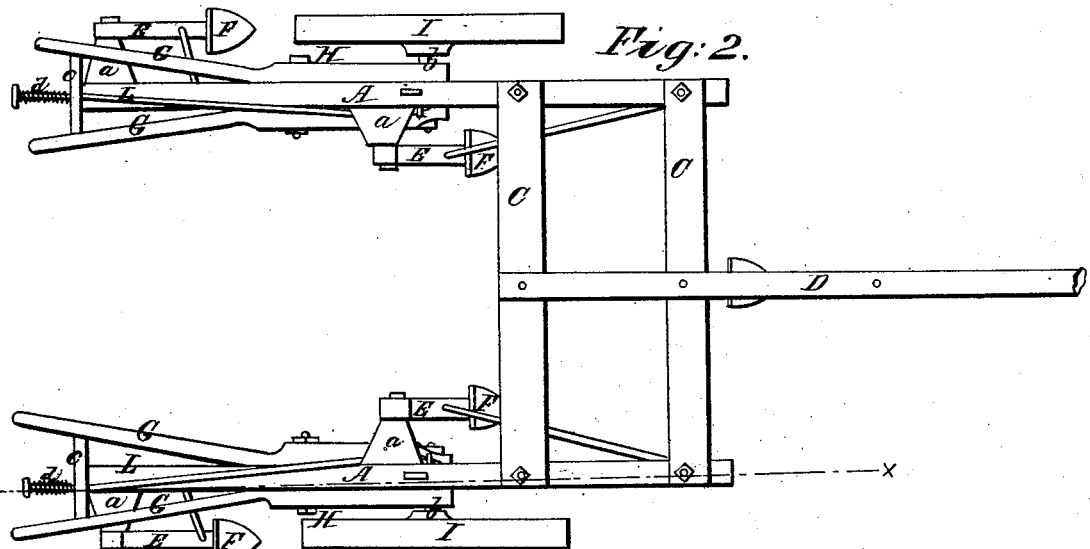

UNITED STATES PATENT OFFICE.

GARLAND B. ST. JOHN, OF KALAMAZOO, MICHIGAN.

IMPROVEMENT IN CULTIVATORS.

Specification forming part of Letters Patent No. 49,008, dated July 25, 1865.

*To all whom it may concern:*

Be it known that I, GARLAND B. ST. JOHN, of Kalamazoo, in the county of Kalamazoo and State of Michigan, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same.

This invention consist in combining and arranging two plow-beams with wheels and levers arranged in such a manner as to operate very efficiently.

A A represent two plow-beams, the front parts of which are connected by two cross-bars, C C, the latter having the draft-pole D attached to them. The plow-beams have standards E secured to them, with plows F at their lower ends, the front and rear standards of each beam being secured to lateral projections $a$ on the beams, the front projections, $a$, being at the inner and the rear projection at the outer sides of the beams, as shown clearly in Fig. 2. The central standard extends down directly from each beam. By this arrangement the three plows of each beam are not in line with each other, each plow making a furrow by the side of the one made by the plow directly in front of it.

Each plow-beam A has two handles, G G, attached to it by a pivot-bolt, H. These handles extend down below the beams A, and they have metal blocks $a^x$ fitted in them, in which the axles $b$ of wheels I are fitted. These wheels support the machine, and the beams and plows may be raised or lowered by adjusting the handles G in a more or less oblique position, and these handles may be secured at any desired point by means of segment-racks J, which are notched and have catches K fitting in them, said catches being at the lower ends of rods L, which pass up through the cross-bars $c$ of the handles, and have springs $d$ on them, which springs have a tendency to keep the catches engaged with the segment-racks J. (See Fig. 1.)

The segment-racks J are attached to the under sides of the beams, and it will be seen that by adjusting the handles G G the plows may be raised and lowered so as to work at the required depth in the soil.

This implement may be used either as a corn-cultivator or as a fallow or wheat cultivator. It may be constructed at a moderate expense, and it is under the complete control of the attendant or operator.

Having thus described my invention, I claim as new and desire to secure by Letters Patent—

The two plow-beams A A, connected together, as shown, in connection with the handles G G, pivoted to the beams, and having the wheels I attached to them, and the segment-racks J and catches K, all arranged substantially as and for the purpose herein set forth.

GARLAND B. ST. JOHN.

Witnesses:
MARTIN HEYDENBERK,
SYLVESTER G. ST. JOHN.